United States Patent [19]

Nebelung

[11] Patent Number: 4,655,813
[45] Date of Patent: Apr. 7, 1987

[54] MOULD OPENING AND CLOSING MECHANISM FOR A GLASSWARE FORMING MACHINE

[75] Inventor: Hermann H. Nebelung, Zurich, Switzerland

[73] Assignee: Emhart Industries, Inc., Farmington, Conn.

[21] Appl. No.: 836,773

[22] Filed: Mar. 5, 1986

[30] Foreign Application Priority Data

Mar. 19, 1985 [GB] United Kingdom ............ 8507077

[51] Int. Cl.⁴ .................................................. C03B 11/06
[52] U.S. Cl. ........................................ 65/359; 65/165; 65/357; 65/356; 65/360
[58] Field of Search ............... 65/359, 361, 360, 357, 65/163, 165

[56] References Cited

U.S. PATENT DOCUMENTS

| | | | |
|---|---|---|---|
| 3,586,491 | 6/1971 | Mennitt | 65/357 X |
| 4,388,099 | 6/1983 | Hermening et al. | 65/357 X |
| 4,448,600 | 5/1984 | Braithwaite et al. | 65/359 X |
| 4,543,118 | 9/1985 | Nebelung | 65/357 X |
| 4,612,032 | 9/1986 | Nebelung | 65/165 |

FOREIGN PATENT DOCUMENTS

547295  3/1932  Fed. Rep. of Germany ........ 65/359

*Primary Examiner*—Arthur Kellogg
*Attorney, Agent, or Firm*—H. Samuel Kieser

[57] ABSTRACT

The mechanism comprises two mould support arrangements (14; 114) each comprising a supporting arm (16; 116) pivotal about a first fixed axis (18; 118), a support (22; 122) for mould portions pivotal on the arm about a second vertical axis (24; 124), and a link (36; 136) pivotal about a third fixed vertical axis (28; 128) and on the support about a fourth fixed vertical axis (38; 138). The first axes (18; 118) of the support arrangements are spaced from one another and the first, second, third and fourth axes of each arrangement are arranged at the corners of a parallelogram to retain the relative orientations of mould portions as the arms (16; 116) pivot about the first axes (18; 118).

9 Claims, 7 Drawing Figures

Fig_3

Fig-4

MOULD OPENING AND CLOSING MECHANISM FOR A GLASSWARE FORMING MACHINE

BACKGROUND OF THE INVENTION

This invention is concerned with a mould opening and closing mechanism for a glassware forming machine operable to move opposed mould portions between a mould-closed position, in which the opposed mould portions engage one another and co-operate in defining a mould cavity, and a mould-open position in which the opposed mould portions are separated from one another.

In a glassware forming machine of the so-called "individual section" type, a plurality of sections, each of which is an individual glassware forming unit, are arranged side by side to receive gobs of molten glass from a common source in a predetermined sequence. Each section comprises a blank mould station at which gobs of molten glass are moulded into parisons by either a blowing or a pressing operation, a parison-transferring mechanism operable to transfer parisons from the blank station to a blow station of the machine, and a blow station at which parisons transferred to the blow station are blown into articles of glassware. The blank station and the blow station of each section each have a mould opening and closing mechanism operable to move opposed mould portions between a mould-closed position and a mould-open position. At the blank station of a section, the mould portions co-operate in defining a mould cavity in which a gob can be moulded into a parison and, at the blow station of a section, the mould portions co-operate in defining a mould cavity in which a parison can be blown into an article of glassware. Where the section receives only one gob at a time, the mould opening and closing mechanisms are arranged to move the portions of only one mould, but where the section receives more than one gob at a time, the mechanisms are arranged to move the portions of a like number of moulds simultaneously.

In a conventional glassware forming machine of the individual section type, the mould opening and closing mechanisms at the blank station and the blow station are similar in construction. Each such mechanism comprises two mould support arrangements, each mould support arrangement comprising a supporting arm mounted for movement about a first vertical axis defined by a pivot pin mounted so that the axis remains stationary, the first axes of the supporting arms being coincident and defined by a single pivot pin. Each mould support arrangement also comprises a mould portion support mounted on the supporting arm for pivoting movement about a second vertical axis which moves with the supporting arm. The mould portion supports are only able to make limited pivoting movement about the second vertical axis, being restrained by a pin of the supporting arm which enters a hole in the mould portion support, this pivoting movement being provided to equalise the pressure across the face on which the mould portions engage one another in the mould-closed position. The mould portion supports are arranged to support one or more mould portions, depending on the number of gobs supplied to the section at a time, so that opposed mould portions can be supported one on each mould portion support. The mechanism also comprises drive means operable to pivot the supporting arms of the support arrangements to move the mould portions supported by the mould portion supports between their mould-open and mould-closed positions. Thus, one of the supporting arms is pivoted clockwise about the first vertical axis while the other supporting arm is pivoted anti-clockwise about the aforesaid first vertical axis. In a conventional machine, the drive means comprises motor means operable to turn two vertical shafts about longitudinal axis thereof, one clockwise and the other anti-clockwise, through a predetermined angle. Two arms are fixed to and project horizontally from the vertical shafts, one from each shaft, and two links pivotally connect the arms to the supporting arms of the mould support arrangement so that, when the shafts are turned, the supporting arms pivot about their first vertical axes, one clockwise and the other anti-clockwise.

Although, in a conventional mould opening and closing mechanism as described above, the mould portion supports are mounted in a simple manner on arcuately moving supporting arms, the mechanism suffers from the disadvantages that, where more than one mould portion is supported on each mould portion support, the distance moved by the mould portions is not equal since the distance moved depends on the distance from the first vertical axis. Since space is very much at a premium in an individual section type machine, this is a serious disadvantage where a number of mould portions are mounted on the same mould portion support. Furthermore, the mould supporting arms are swung through a relatively large angle, typically 65°, so that the time taken to open and close the moulds is longer than is desirable. While alternative mould opening and closing mechanisms have been devised in which the mould portions are moved linearly towards or away from one another, these mechanisms have involved replacement of the simple mounting of the mould portion support on an arcuately moving arm and the introduction of more complex arrangements.

It is an object of the present invention to provide a mould opening and closing mechanism in which the aforementioned disadvantages are avoided without replacement of the mounting of the mould portion supports on arcuately moving supporting arms.

BRIEF SUMMARY OF THE INVENTION

The invention provides a mould opening and closing mechanism for a glassware forming machine operable to move opposed mould portions between a mould-closed position, in which the opposed mould portions engage one another and co-operate in defining a mould cavity, and a mould-open position in which the opposed mould portions are separated from one another, the mechanism comprising two mould support arrangements, each mould support arrangement comprising a supporting arm mounted for movement about a first vertical axis defined by a pivot pin mounted so that the axis remains stationary, and a mould portion support mounted on the supporting arm for pivoting movement about a second vertical axis which moves with the supporting arm, the mould portion support being arranged to support one or more mould portions so that opposed mould portions can be supported one on each mould portion support, the mechanism also comprising drive means operable to pivot the supporting arms of the support arrangements to move mould portions supported by the mould portion supports between their mould-open and mould-closed positions, wherein the first vertical axes of the two supporting arms are spaced from one another, and each mould support arrangement also comprises a link connected at one end portion thereof to the mould portion support for pivoting movement about a third vertical axis which moves with the mould portion support and connected at an opposite end portion thereof to a vertical shaft for pivoting movement about a fourth vertical axis defined by the shaft which is mounted so that the axis remains stationary, the first, second, third and fourth axes being arranged at the corners of a parallelogram.

In a mould opening and closing mechanism according to the last preceding paragraph, the orientation of the mould portion supports with respect to one another is maintained constant during the movement of the mould portion supports by the action of the links. Since the orientation of the mould portion supports remains substantially constant, it is possible to mount all the mould portions supported by the mould portion supports so that they move the same distance in moving between their mould-open and mould-closed positions. Furthermore, the angle through which the supporting arms move can be considerably reduced by comparison with the conventional mechanism described above, a reduction of the angle to 24° being possible in some circumstances and a reduction to an angle between 34° and 24° being possible in most circumstances. This reduction in the angle of movement allows the mechanism to operate more quickly.

In a conventional mould opening and closing mechanism, the aforementioned vertically-extending pivot pin which defines the first vertical axis is located on an extension of the line on which the opposed mould portions come into engagement in their mould-closed position. This pivot pin is located in the case of the mould opening and closing mechanism at the blow station of the section at a point beneath the mid-point of the travel of a parison from the blank station of the section to the blow station thereof. It has been recognised, that it is advantageous to be able to reject a parison between the blank station and the blow station of a section, the advantage being that the blank station can operate independently of the blow station allowing a more efficient start-up procedure for the section and also allowing for repairs to be carried out to the blow station without shutting down the blank station thereby enabling the working temperature of the blank station to be maintained. Attempts to enable a parison to be rejected in this way have involved the use of a moving parison-catching device which is expensive and inconvenient. The provision of a simple cullet chute beneath the mid-point of the parison travel has hitherto not been possible because of the presence of the aforementioned pivot pin. However if in a mould opening and closing mechanism in accordance with the last preceding paragraph but one, the first vertical axes of the two supporting arms are disposed on opposite sides of a cullet chute of a glassware forming machine into which glass parisons formed in the machine can be dropped, it is possible to stop the parison transfer mechanism with the parison at its mid-point and drop the parison directly into the cullet chute, thereby obtaining the advantage mentioned above in a simple manner.

Where the drive means is of conventional form, as described above, the vertical shafts of the drive means may be the same vertical shafts with which the links of the mould support arrangements are pivotally connected. Alternatively, the drive means may be arranged to turn the pivot pins which define the first vertical axes thereby reducing the number of links required.

The provision of two pivot pins instead of the conventional one has the further advantage that cooling passages can be provided in the pivot pins through which cooling air can pass. The cooling passages can pass cooling air to the mould portions either through passages in the arms or pipes mounted on the arms, While such an arrangement could be provided in the conventional single pivot pin arrangement, it is difficult to provide cooling passages of sufficient diameter whereas, where there are two pivot pins, half the air flows through each pin.

BRIEF DESCRIPTION OF THE DRAWINGS

There now follows a detailed description, to be read with reference to the accompanying drawings, of two mould opening and closing mechanisms for a glassware forming machine which are illustrative of the invention. It is to be understood that the illustrative mould opening and closing mechanisms have been selected for description by way of example and not of limitation of the invention.

In the drawings.

DETAILED DESCRIPTION OF PREFERRED EMBODIMENTS OF THE INVENTION

The first illustrative mould opening and closing mechanism (shown in FIGS. 1 and 2) is for a glassware forming machine of the individual section type and is located at the blow station of a section, although a similar mould opening and closing mechanism may be used at the blank station of a section. The first illustrative mould opening and closing mechanism is operable to move opposed mould portions 10 between a mould-closed position (shown in FIG. 1), in which the opposed mould portions 10 engage one another and co-operate in defining a mould cavity 12 in which parisons of molten glass can be blown into articles of glassware, and a mould-open position (shown in FIG. 2) in which the opposed mould portions 10 are separated from one another to allow removal of articles of glassware from the blow station.

Figure 1:
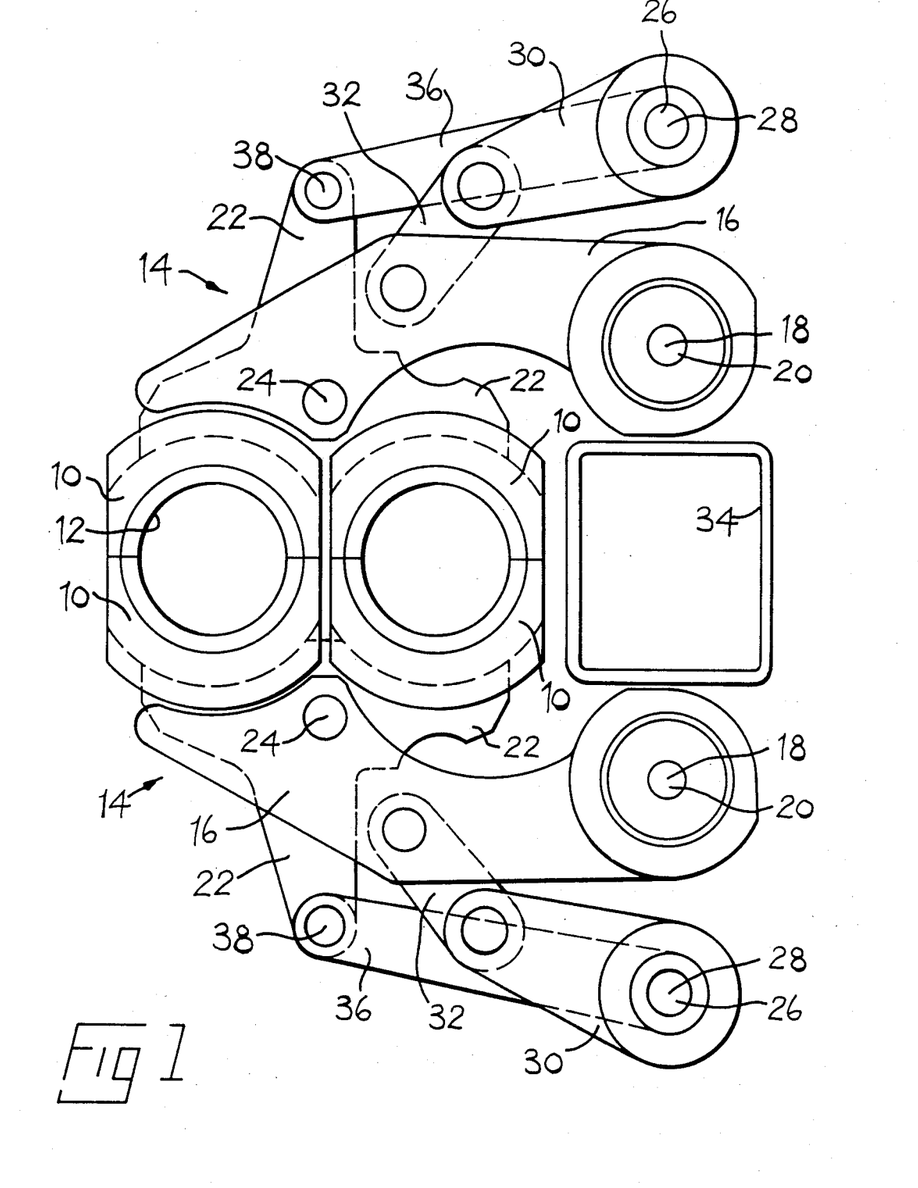
FIG. 1 is a plan view of the first illustrative mould opening and closing mechanism showing mould portions supported thereby in a mould-closed position thereof.
Figure 2:
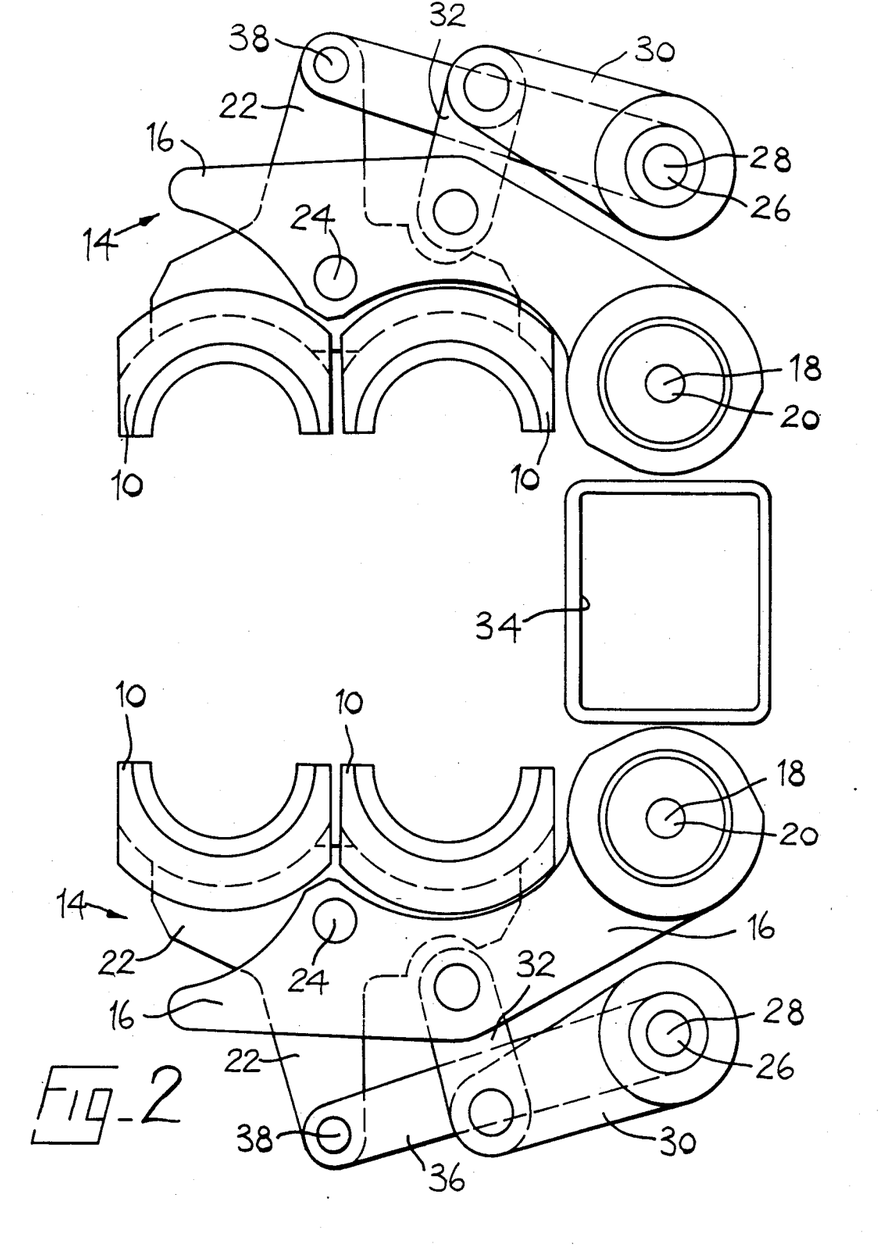
FIG. 2 is a view similar to FIG. 1 but showing the mould portions in a mould-open position thereof.

The first illustrative mould opening and closing mechanism comprises two mould support arrangements 14 which are mirror-opposites of one another. Each mould support arrangement 14 comprises a supporting arm 16 mounted for movement about a first vertical axis 18 defined by a pivot pin 20 mounted on the frame of the section so that the axis 18 remains stationary. Each mould support arrangement 14 also comprises a mould portion support 22 mounted on the supporting arm 16 for pivoting movement about a second vertical axis 24 which moves with the supporting arm 16. The mould portion supports 22 are arranged, in conventional manner, to support two mould portions 10 so that opposed mould portions 10 of the same mould can be supported one on each mould portion support 22.

The first illustrative mould opening and closing mechanism also comprises drive means operable to pivot the supporting arms 16 of the support arrangements 14 to move the mould portions 10 supported by the mould portion supports between their mould-open and mould-closed positions. The drive means comprises motor means (not shown) operable to turn two vertical shafts 26 about longitudinal axes 28 thereof, one clockwise and the other anti-clockwise. The motor means may be a piston and cylinder assembly, as is conventional, or a hydraulic rotary motor or an electric motor. The use of two vertical shafts which are turned about their longitudinal axes in this context is conventional in glassware forming machines of the individual section type. The motor means is operable to turn the vertical shafts 26 through a predetermined angle. Two arms 30 of the drive means are fixed to and project horizontally from the vertical shafts 26, one arm 30 projecting from each shaft 26. The drive means also comprises two links 32 which are each pivotally connected to one of the arms 30 and to one of the supporting arms 16 so that, when the shafts 26 are turned, the supporting arms 16 pivot about their first vertical axes 18, one clockwise and the other anti-clockwise. As one of the shafts 26 turns the arm 30 moves arcuately about the axis 28 and the link 32 causes the supporting arm 16 to move about the axis 18.

The first vertical axes 18 of the two supporting arms 16 are spaced from one another. These axes 18 are disposed on opposite sides of a cullet chute 34 of the glassware forming machine. Glass parisons formed at the blank station of the section can be dropped into the cullet chute 34. This is achieved by stopping the parison transferring mechanism (not shown) when the parisons are at a mid-point in their travel from the blank station to the blow station and opening the neck rings of the transferring mechanism by which the parisons are held. Thus, it is possible to operate the blank station of the section independently of the blow station thereof. This gives the advantages that the blank station can be started independently of the blow station and that the blow station can be closed down for repair or replacement of mould without shutting down the blank station and therefore without losing the working temperature of the blank station. Each mould support arrangement 14 also comprises a link 36 which is connected at one end portion thereof to the mould portion support 22 for pivoting movement about a third vertical axis 38. Each link 36 is also pivotally connected at an opposite end portion thereof to the vertical shaft 26 associated with the arrangement 14. The link 36 is pivotally connected with the shaft 26 for pivoting movement about a fourth vertical axis defined by the shaft 26 and being, in fact, the longitudinal axis 28 thereof. The shaft 26 is fixedly mounted so that the axis 28 remains stationary. The first 18, second 24, third 38 and fourth 28 vertical axes are arranged at the corners of a parallelogram.

In the operation of the first illustrative mould opening and closing mechanism, the drive means is operable to turn the shafts 26 through a predetermined angle which is between 24° and 34°, viz. 27°, to move the mould portions 10 between the mould-open and mould-closed positions. FIG. 1 shows the mould-closed position in which opposed mould portions 10 engage one another and define mould cavities 12. To reach the mould-open position, the upper shaft 26, viewing the drawings, is turned through 27° clockwise while the lower shaft 26 is turned through 27° anti-clockwise. Turning the shafts 26 causes the arms 16 to turn about the vertical axis 18 and the mould portion supports 22 to be moved apart carrying with them the mould portions 10. As the mould portion supports 22 are moved apart, the links 36 act to maintain the orientation of the mould portion supports 22 with respect to one another so that the mould portions 10 supported by one support 22 are moved through equal distances. To return the mould portions 10 to the mould-closed position, the shafts 26 are turned in the opposite directions through 27°.

The second illustrative mould opening and closing mechanism is for a glassware forming machine of the individual section type and is located at the blow station of a section. The second illustrative mould opening and closing mechanism is operable to move opposed mould portions 110 between a mould-closed position (shown in FIG. 3), in which the opposed mould portions 110 engage one another and co-operate in defining a mould cavity 112 in which parisons of molten glass can be blown into articles of glassware, and a mould-open position (shown in FIG. 4) in which the opposed mould portions 110 are separated from one another to allow removal of articles of glassware from the blow station.

Figure 3:
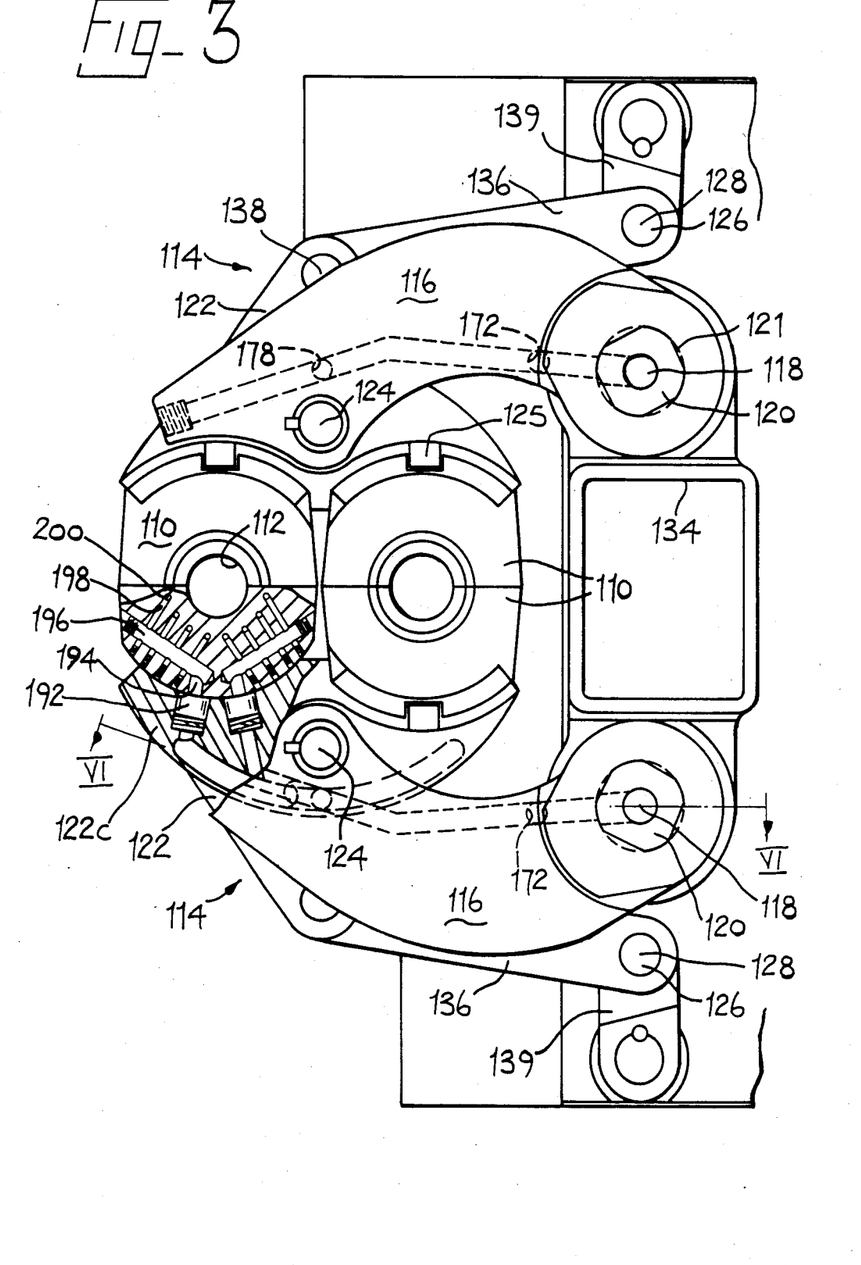
FIG. 3 is a view similar to FIG. 1 but of the second illustrative mould opening and closing mechanism.
Figure 4:
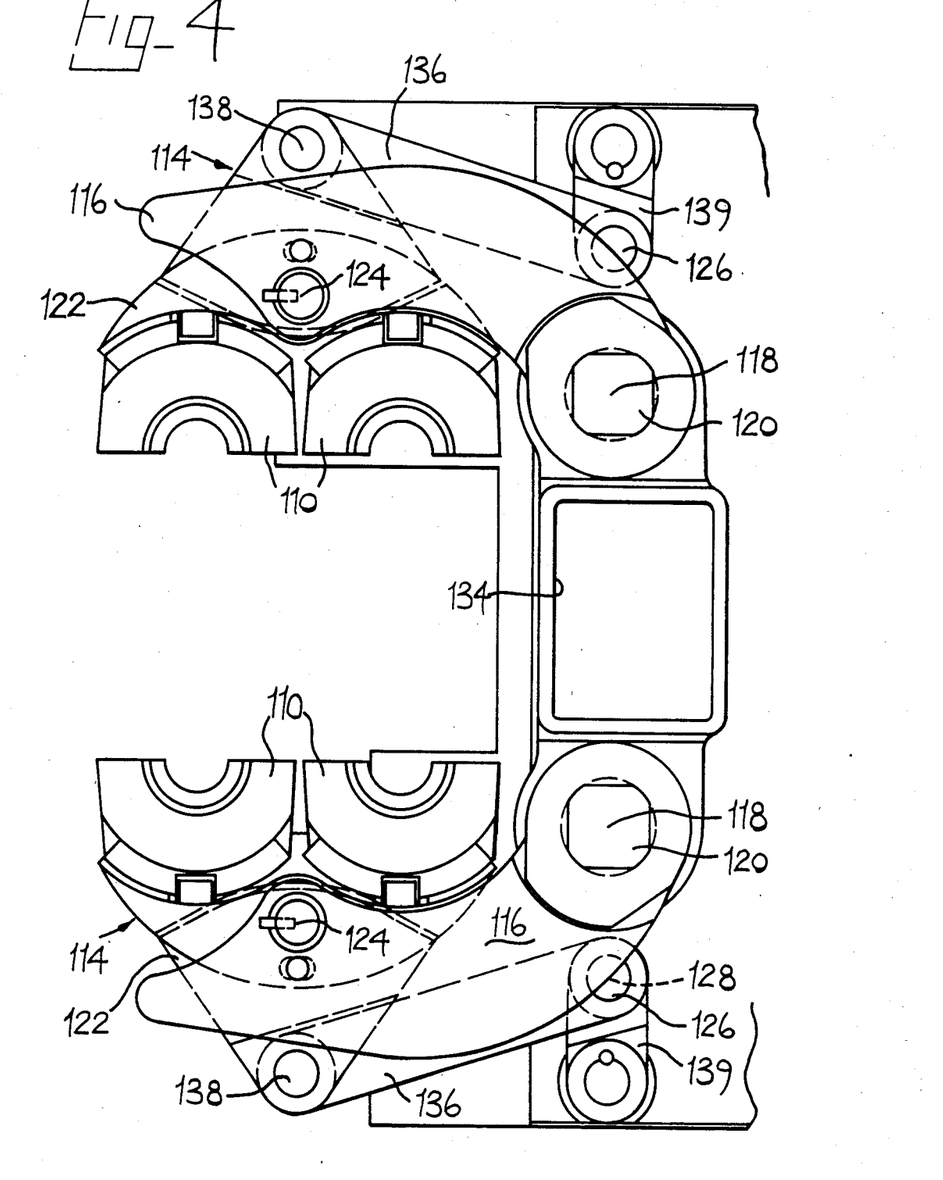
FIG. 4 is a view similar to FIG. 2 but of the second illustrative mould opening and closing mechanism.

The second illustrative mould opening and closing mechanism comprises two mould support arrangements 114 which are mirror-opposites of one another. Each mould support arrangement 114 comprises a supporting arm 116 mounted for movement about a first vertical axis 118 defined by a pivot pin 120. The arm 116 is received over an upper portion of the pivot pin 120 which has flats 121 formed thereon to transmit drive between the pin 120 and the arm 116.

Each mould support arrangement 114 also comprises a mould portion support 122 mounted on the supporting arm 116 for pivoting movement about a second vertical axis 124 which moves with the supporting arm 116. The mould portion supports 122 are arranged, in conventional manner, to support two mould portions 110 so that opposed mould portions 110 of the same mould can be supported one on each mould portion support 122. The support 122 has projections 125 arranged to fit into recesses of the mould portions 110 to locate the latter.

Figures 5, 6:
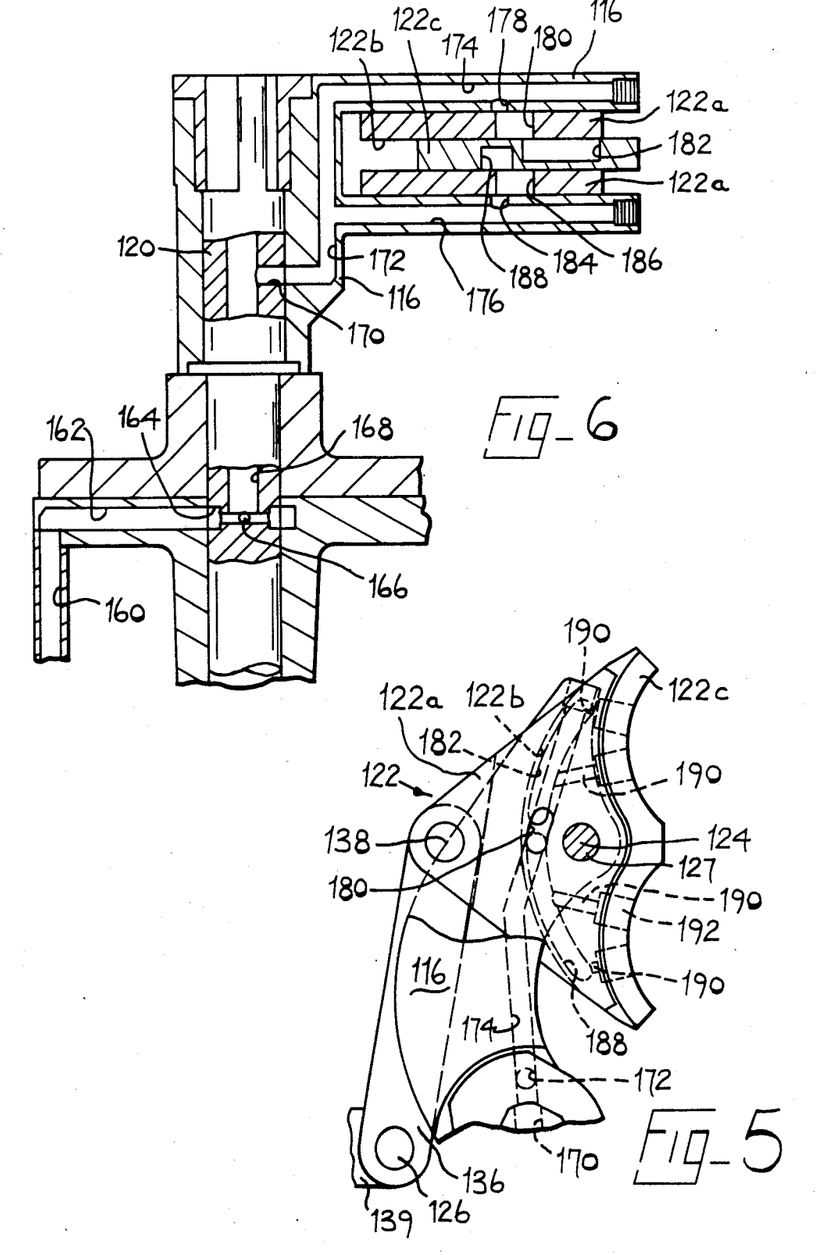
FIG. 5 is a plan view with parts broken away and the mould portions removed of one of the mould supports of the second illustrative mould opening and closing mechanism.
FIG. 6 is a sectional view on the line VI—VI in FIG. 3.

The mould portion support 122 has two parts which are received between upper and lower portions of the arm 116 (see FIGS. 5 and 6). A first part 122a of the support 122 is formed with a slot 122b extending horizontally therein in which the other part 122c of the support 122 is received. The portion 122a is mounted on a pin 127 which defines the axis 124. The pin 127 is mounted on the supporting arm 116. The pin 127 passes through the slot 122b and the portion 122c of the support 122 is pivotally mounted thereon. The portion 122c can pivot to a limited extent relative to the portion 122a about the axis 124 of the pin 127 to allow some "float" when the mould portions 110 engage one another. The portion 122c has a projection on which the mould portions 110 are mounted.

Figure 7:
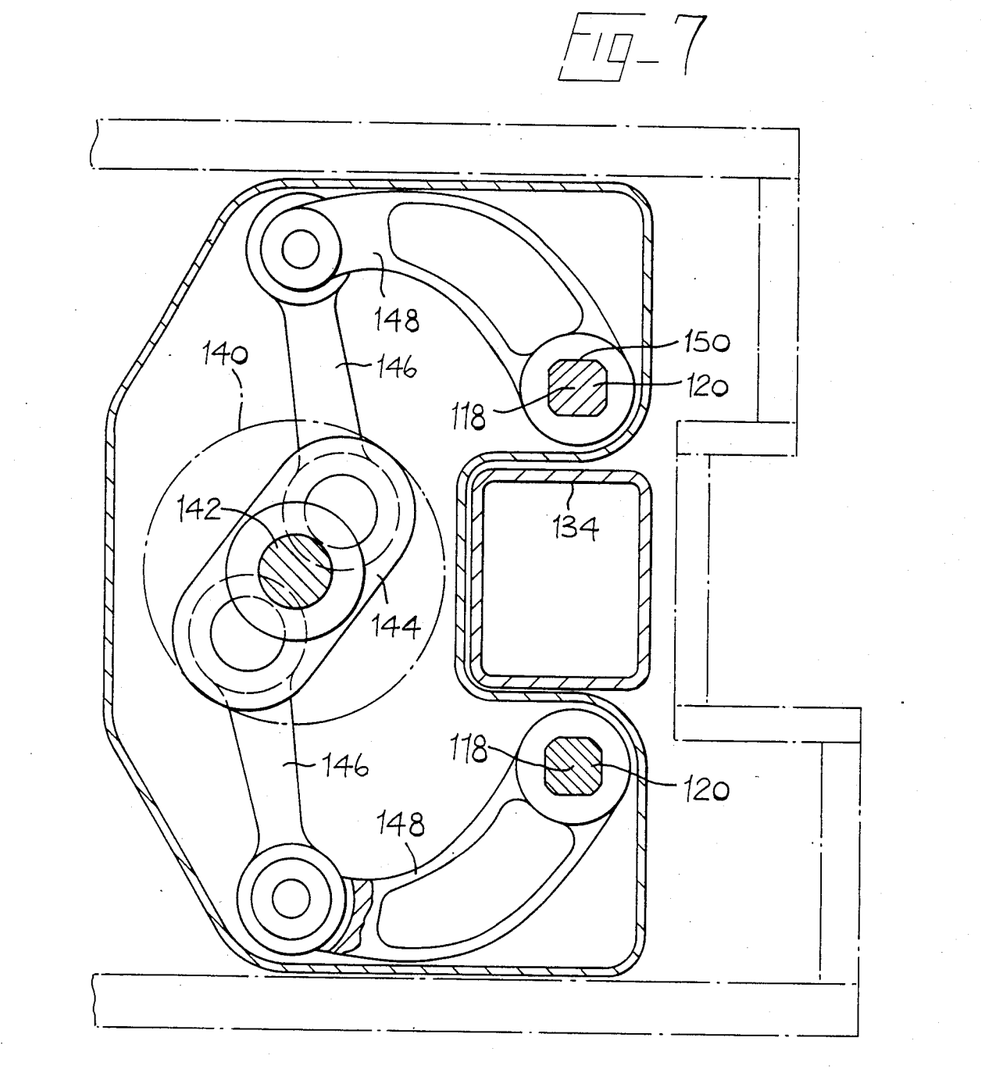
FIG. 7 is a horizontal cross-sectional view taken through drive means of the second illustrative mould opening and closing mechanism.

The second illustrative mould opening and closing mechanism also comprises drive means operable to pivot the supporting arms 116 of the support arrangements 114 to move the mould portions 110 supported by the mould portion supports between their mould-open and mould-closed positions. The drive means comprises motor means 140 (see FIG. 7) in the form of a rotary hydraulic motor having an output shaft 142. The motor means is operable to turn the pivot pins 120 about the first axes 118 thereof, one clockwise and the other anti-clockwise. The shaft 142 of the motor 140 carries a lever 144 which is fixedly mounted on the shaft 142. The lever 144 is, therefore, turned by operation of the motor 140 about a central axis of the shaft 142. The lever 144 is pivotally connected to two links 146, the links being pivotally connected to the lever 144 at opposite end portions thereof and equi-distant from the axis of the shaft 142. Each link 146 is pivotally connected to an arm 148 which projects from one of the pivot pins 120, each arm 148 being received over a lower end portion 120 of the pivot pins which has flats 150 to pass drive from the arm 148 to the pin 120. Thus, when the motor 140 is operated to turn the shaft 142, the lever 144 turns about the central axis of the shaft 142 and the links 146 act to cause the arms 148 to turn about the central axes 118 of the shafts 120 thereby turning the shafts 120. One shaft 120 is turned clockwise and the other is turned anti-clockwise, the angle of turn being approximately 27° to move the mould portions 110 from their mould-closed position shown in FIG. 3 to their mould-open position shown in FIG. 4. The motor 140 is thus operable to turn the pivot pins 120 through a predetermined angle. Turning the pins 120 through the predetermined angle moves the arms 116 about the axes 118 moving the supports 122 towards or away from one another to open or close the moulds.

The first vertical axis 118 of the two supporting arms 116 are spaced from one another. These axes 118 are disposed on opposite sides of a cullet chute 134 of the glassware forming machine. Glass parisons formed at the blank station of the section can be dropped into the cullet chute 134. This is achieved by stopping the parison transferring mechanism when the parisons are at a mid-point in their travel from the blank station to the blow station and opening the neck rings of the transferring mechanism by which the parisons are held. Thus, it is possible to operate the blank station of the section independently of the blow station thereof.

Each mould support arrangement 114 also comprises a link 136 which is connected at one end portion thereof to the mould portion support 122 for pivoting movement about a third vertical axis 138. Each link 136 is also connected at an opposite end portion thereof to a vertical shaft 126 associated with the arrangement 114. The link 136 is pivotally connected with the shaft 126 for pivoting movement about a fourth vertical axis defined by the shaft 126 and being the longitudinal axis 128 thereof. The shaft 126 is fixedly mounted on a bracket 139 which is fixedly mounted on a frame of the machine so that the axis 128 remains stationary. The first 118, second 124, third 138 and fourth 128 vertical axes are arranged at the corners of a parallelogram.

In the operation of the second illustrative mould opening and closing mechanism, the drive means is operable to turn the pivot pins 120 to move the mould portions 110 between their mould-open and mould-closed positions. As the mould portion supports 122 are moved apart, the links 136 act to maintain the orientation of the mould portion supports 122 with respect to one another so that the mould portions 110 supported by one support 122 are moved equal distances.

FIG. 6 illustrates the supply of cooling air to the mould portions 110. A cooling passage 160 passes upwardly through a side member of the frame of the section of the machine and is connected at one end portion thereof to a source of air under pressure (not shown) and at the other end thereof to a passage 162 which extends horizontally in a frame member and communicates with an annular groove 164 formed in the pivot pin 120. The annular groove 164 communicates through four horizontal passages 166 formed in the pivot pin 120 with a vertically extending passage 168 formed in the pin 120. Thus, each pivot pin 120 contains a vertically-extending cooling passage 168 arranged to supply cooling air to the or each mould portion 110 supported by the supporting arm 116 mounted on the pivot pin 120. The cooling passage 168 communicates through a horizontal passage 170 in the pivot pin 120 with a vertically extending passage 172 in the arm 116. The passage 172 communicates with an upper passage 174 extending horizontally in the arm 116 and also with a lower passage 176 extending horizontally in the arm 116. The upper passage 174 communicates through a passage 178 passing downwardly through the arm 116 with an arcuate passage 180 formed in the portion 122a of the support 122. The passage 180 communicates with an arcuate passage 182 in the portion 122c of the support 122. The passage 176 communicates through a passage 184 passing upwardly in the arm 116 via a passage 186 in the portion 122a which is similar to the passage 180 to a passage 188 in the portion 122b which is similar to the passage 182. The passages 182 and 188 are connected by horizontal passages 190 to spring loaded connectors 192 which are arranged to pass cooling air into passages formed in the mould portions 110. FIG. 3 illustrates the arrangement of the spring loaded connectors 192 and the cooling passages in the mould portions 110 the air from the connector 192 passes into a horizontal bore 194 from which it passes into a further horizontal bore 196 to which branch bores 198 are connected. The branch bores 198 are connected to vertical passages 200 extending upwardly or downwardly to the ends of the mould portion 110 through which the air can exhaust to the atmosphere.

I claim:

1. A mould opening and closing mechanism for a glassware forming machine operable to move opposed mould portions between a mould-closed position, in which the opposed mould portions engage one another and co-operate in defining a mould cavity, and a mould-open position in which the opposed mould portions are separated from one another, the mechanism comprising two mould support arrangements, each mould support arrangement comprising a supporting arm mounted for movement about a first vertical axis defined by a pivot pin mounted so that the axis remains stationary, and a mould portion support mounted on the supporting arm for pivoting movement about a second vertical axis which moves with the supporting arm, the mould portion support being arranged to support one or more mould portions so that opposed mould portions can be supported one on each mould portion support, the mechanism also comprising drive means operable to pivot the supporting arms of the support arrangements to move mould portions supported by the mould portion supports between their mould-open and mould-closed positions, wherein the first vertical axes of the two supporting arms are spaced from one another, and each mould support arrangement also comprises a link connected at one end portion thereof to the mould portion support for pivoting movement about a third vertical axis which moves with the mould portion support and connected at an opposite end portion thereof to a vertical shaft for pivoting movement about a fourth vertical axis defined by the shaft which is mounted so that the axis remains stationary, the first, second, third and fourth axes being arranged at the corners of a parallelogram.

2. A mould opening and closing mechanism according to claim 1, wherein the first vertical axes of the two supporting arms are disposed on opposite sides of a cullet chute of a glassware forming machine into which glass parisons formed in the machine can be dropped.

3. A mould opening and closing mechanism according to claim 1, wherein the drive means comprises motor means operable to turn two vertical shafts about longitudinal axes thereof, one clockwise and the other anti-clockwise, through a predetermined angle, two arms one fixed to and projecting horizontally from each vertical shaft and two links each pivotally connected to one of the arms and to one of the supporting arms so that, when the shafts are turned, the supporting arms pivot about their first vertical axes, one clockwise and the other anti-clockwise.

4. A mould opening and closing mechanism according to claim 3, wherein the predetermined angle is between 24° and 34°.

5. A mould opening and closing mechanism according to claim 3, wherein the vertical shafts of the drive means are the same vertical shafts with which the links of the mould support arrangements are pivotally connected.

6. A mould opening and closing mechanism according to claim 1, wherein the drive means comprises motor means operable to turn the pivot pins about the first vertical axes, one clockwise and the other anti-clockwise, through a predetermined angle.

7. A mould opening and closing mechanism according to claim 6, wherein the predetermined angle is between 24° and 34°.

8. A mould opening and closing mechanism according to claim 1, wherein each pivot pin contains a vertically-extending cooling passage arranged to supply cooling fluid to the or each mould portion supported by the supporting arm mounted on the pivot pin.

9. A mould opening and closing mechanism according to claim 8, wherein the cooling passage in each pivot pin is arranged to supply cooling fluid to cooling passages formed in the supporting arm which are arranged to conduct cooling fluid to passages formed in the or each mould portion supported by the arm.

* * * * *